(12) United States Patent
Giere

(10) Patent No.: US 9,693,501 B2
(45) Date of Patent: Jul. 4, 2017

(54) MOWER WITH SCISSOR LIFT MOWING HEIGHT ADJUSTMENT MECHANISM

(71) Applicant: Shivvers Group Incorporated, Corydon, IA (US)

(72) Inventor: David W Giere, Corydon, IA (US)

(73) Assignee: Shivvers Group Incorporated, Corydon, IA (US)

( * ) Notice: Subject to any disclaimer, the term of this patent is extended or adjusted under 35 U.S.C. 154(b) by 1 day.

(21) Appl. No.: 14/808,318

(22) Filed: Jul. 24, 2015

(65) Prior Publication Data

US 2016/0037717 A1   Feb. 11, 2016

Related U.S. Application Data

(60) Provisional application No. 62/033,911, filed on Aug. 6, 2014.

(51) Int. Cl.
  *A01D 34/00*  (2006.01)
  *A01D 34/74*  (2006.01)
  *A01D 34/64*  (2006.01)

(52) U.S. Cl.
  CPC ............ *A01D 34/74* (2013.01); *A01D 34/64* (2013.01); *A01D 2034/645* (2013.01)

(58) Field of Classification Search
  CPC .................. A01D 34/662; A01D 34/74; A01D 2034/645; A01D 34/64
  USPC ......................................................... 56/17.1
  See application file for complete search history.

(56) References Cited

U.S. PATENT DOCUMENTS

| | | | | |
|---|---|---|---|---|
| 3,283,486 A | * | 11/1966 | Marek | A01D 34/64 280/400 |
| 3,512,344 A | * | 5/1970 | Kortum | A01D 34/64 56/17.1 |
| 3,777,459 A | | 12/1973 | Elliott | |
| 3,795,094 A | | 3/1974 | Mollen et al. | |
| 3,874,150 A | * | 4/1975 | Boeck | A01D 34/74 56/15.9 |
| 4,120,136 A | * | 10/1978 | Rose | A01B 59/044 56/15.8 |
| 4,311,204 A | | 1/1982 | Shupert | |
| 4,679,382 A | | 7/1987 | Saruhashi et al. | |
| 4,760,686 A | | 8/1988 | Samejima et al. | |
| 4,779,406 A | | 10/1988 | Schroeder | |
| 4,829,754 A | | 5/1989 | Shimemura et al. | |
| 4,869,057 A | | 9/1989 | Siegrist | |

(Continued)

OTHER PUBLICATIONS

Brochure Bob-Cat ZT 200 Series, by Ransomes Bob-Cate.
(Continued)

*Primary Examiner* — Árpád Fábián-Kovács
(74) *Attorney, Agent, or Firm* — John C. McMahon

(57) ABSTRACT

A reduced weight underbelly mower has a cutting deck suspended beneath a frame by a deck height adjustment mechanism with a pivotable scissor configuration. The deck height adjustment mechanism cooperates with the mower frame so as manually or through a motorized jack to adjust the cutting height. Due to the mower's reduced weight and the scissor-like configuration of the deck height adjustment mechanism, an operator can manually lift the mower front end and swing the deck rear swinging forward, such that the mower rests stably on the deck rear and the deck underside is exposed for maintenance procedures.

13 Claims, 5 Drawing Sheets

(56) References Cited

U.S. PATENT DOCUMENTS

| | | | |
|---|---|---|---|
| 4,930,801 | A | 6/1990 | Gillund |
| 4,962,636 | A * | 10/1990 | Sampei ............... A01D 34/64 56/17.1 |
| 5,025,617 | A | 6/1991 | Kuhn et al. |
| 5,065,568 | A * | 11/1991 | Braun ............... A01D 34/64 56/14.9 |
| 5,079,907 | A | 1/1992 | Sameshima et al. |
| 5,079,926 | A | 1/1992 | Nicol |
| 5,154,043 | A | 10/1992 | Schemelin et al. |
| 5,355,665 | A | 10/1994 | Peter |
| 5,410,865 | A | 5/1995 | Kurohara et al. |
| 5,433,066 | A | 7/1995 | Wenzel et al. |
| 5,459,984 | A | 10/1995 | Reichen et al. |
| 5,475,971 | A | 12/1995 | Good et al. |
| 5,528,886 | A | 6/1996 | Esau |
| 5,528,889 | A | 6/1996 | Kure et al. |
| 5,784,870 | A | 7/1998 | Seegert et al. |
| 5,813,203 | A | 9/1998 | Peter |
| 5,816,033 | A | 10/1998 | Busboom et al. |
| 5,816,035 | A * | 10/1998 | Schick ............... A01D 34/74 56/15.2 |
| 5,873,224 | A * | 2/1999 | Murakawa ............ A01D 34/64 56/11.4 |
| 5,915,487 | A | 6/1999 | Splittstcesser et al. |
| 5,927,055 | A | 7/1999 | Feree et al. |
| 5,956,932 | A | 9/1999 | Schmidt |
| 6,012,274 | A | 1/2000 | Eavenson et al. |
| 6,023,921 | A | 2/2000 | Burns et al. |
| 6,122,903 | A * | 9/2000 | Hayashi ............... A01D 34/74 56/15.7 |
| 6,293,077 | B1 | 9/2001 | Plas et al. |
| 6,341,480 | B1 * | 1/2002 | Dahl ............... A01D 34/662 56/15.9 |
| 6,347,502 | B1 | 2/2002 | deVries |
| 6,347,503 | B1 | 2/2002 | Esau et al. |
| 6,393,815 | B1 | 5/2002 | Funk et al. |
| 6,398,681 | B1 | 6/2002 | Wanie |
| 6,434,919 | B2 | 8/2002 | Schick |
| 6,470,660 | B1 | 10/2002 | Buss et al. |
| 6,494,028 | B2 | 12/2002 | Mooe et al. |
| 6,516,597 | B1 | 2/2003 | Samejima et al. |
| 6,530,200 | B1 | 3/2003 | Minoura et al. |
| 6,584,756 | B2 | 7/2003 | Buss |
| 6,658,831 | B2 | 12/2003 | Velke et al. |
| 6,675,567 | B2 | 1/2004 | Samejima et al. |
| 6,874,308 | B1 | 4/2005 | Bartel |
| 6,988,351 | B2 | 1/2006 | Schnick et al. |
| 7,293,398 | B2 | 11/2007 | Koehn |
| 7,347,039 | B2 | 3/2008 | Koehn |
| 7,404,282 | B2 | 7/2008 | Samejima et al. |
| 7,441,392 | B2 | 10/2008 | Lillestieke et al. |
| 7,451,586 | B1 | 11/2008 | Papke et al. |
| 7,481,036 | B2 | 1/2009 | Lilliestielke et al. |
| 8,091,329 | B2 | 1/2012 | Schick |
| 2002/0194826 | A1 | 12/2002 | Schnick et al. |
| 2004/0221561 | A1 | 11/2004 | Koehn |
| 2005/0044838 | A1 | 3/2005 | Rinholm et al. |
| 2006/0010846 | A1 * | 1/2006 | Koehn ............... A01D 34/662 56/14.7 |

OTHER PUBLICATIONS

Brochure Country Clipper Zero Turn Movers, by Shivvers, Mfg.
Brochure Country Clipper Flip Up Deck, by Shivvers, Mfg.
Brochure Z48, by Encore.
Brochure Exmark Lazer A HP, by Exmark.
Brochure ZTR 5000 Series, by Dixon.
Brochure Pro Cut Z's, by Ferris Industries, Inc.
Brochure ZT Max by F.D. Kees Manufacturing Co.
Brochure Snapper Yard Cruiser, by Snapper.
Brochure Twister BZT Zerio-Tuming Radius Riding Mower, by Bunton, Division of Jacobsen.
Brochure Great Dane "Zero Turn Chariot", by Great Dane Power Equipment, Inc.
Brochure Prowler, by Encore Power Equipment.
Brochure MTD Pro MNZ wide-area mower, by MTDpro.
Brochure IS First with Independent Suspension, by Ferris Industries.

* cited by examiner

MOWER WITH SCISSOR LIFT MOWING HEIGHT ADJUSTMENT MECHANISM

CROSS-REFERENCE TO RELATED APPLICATIONS

This application claims the benefit of U.S. Provisional Application No. 62/033,911 filed Aug. 6, 2014, which is incorporated by reference herein.

BACKGROUND OF THE INVENTION

The present invention is directed to a new mechanical mowing height adjustment mechanism for an underbelly mower that includes a simplified mechanism for manually adjusting the mowing height of the mower deck and for placing the mower deck into a stable maintenance position. In some embodiments, the mower deck is manually placed in the maintenance position. The mechanical mowing height adjustment mechanism includes a selectively adjustable scissor lift assembly that can be released at near a middle thereof. The scissor lift assembly substantially reduces the weight of the mower by an amount that is sufficient for an operator to manually lift the front end of the mower. When the scissor lift assembly is released and the operator lifts the mower front end, the mower deck swings downwardly and forward until the rear of the mower deck rests upon the ground and such that the front end of the mower is supported by the mower deck in the maintenance position.

Underbelly mowers are of the type wherein a mower deck is mounted beneath the frame of a tractor or motorized vehicle principally between front and rear wheels of the vehicle. These are very commonly manufactured and used.

A principal drawback of such mowers is that they are difficult to maintain and clean because of the location of the mower deck and the difficulty in getting it raised for such maintenance. In order to get to the underside, the mower deck is traditionally disassembled from the tractor and then ungainly pulled from beneath the frame in order to free the deck of the frame raised on one side or the tractor itself must be raised so as to balance on the rear to give access, which is both somewhat unstable and often difficult to accomplish because the mower and even the mower deck are heavy. Another drawback of some underbelly mowers that allow the mower front to be raised and the deck rear to be unhooked from the frame and swung forward for maintenance is the heavy weight of the mower and the complicated breakable nature of the mechanism that suspends the deck and adjusts the cutting height. In particular, such mowers are too heavy to be lifted by hand. Instead, a powered lifting device must be employed to lift the mower front end. Additionally, certain components of the lift mechanism, such as but not limited to a quick release mechanism, break with regular frequency. When this happens, the deck rear cannot be disconnected. If the mower front is lifted with deck rear still easily connected, the deck open bottom is placed at a slant, relative to the ground or the mower frame. While one could shimmy under such a slanted deck to perform maintenance on the deck underside, this position increases the risk of the mower falling over onto the person under the mower. Consequently, when the deck rear cannot be disconnected, blade maintenance goes unperformed, leading to mower cutting malfunction.

It is therefore desirable to have a simplified underbelly mower that allows a user to manually raise one side of the deck while it is still under the mower frame to allow access to an underside to perform cleaning, repairs or the like and while the mower is in a comparatively stable position. It is also desirable to provide simplified, substantially unbreakable structure that allows a user to quickly and easily disengage an end, preferably the rear end, of the deck from a main frame of the mower so as to allow the deck to rotate or swing on the opposite side to further expose the deck underside for maintenance and then to quickly and easily re-engage the deck with the frame after maintenance is complete.

SUMMARY OF THE INVENTION

An underbelly mower with a frame, a mower deck suspended below the frame, and a scissor lift deck height adjustment mechanism that joins the deck with the frame is provided in a first embodiment. The scissor lift deck height adjustment mechanism cooperates with the frame and the deck to vary the deck cutting height relative to the frame, such that when in a first mode, referred to as the operational mode, the scissor lift deck height adjustment mechanism is operably adjustable between different cutting heights of the deck in a cutting configuration and, when in a second operating mode, referred to as the maintenance mode, the scissor lift deck height adjustment mechanism cooperates with the frame and the deck to allow rotation of the deck about a front end of the deck between the cutting configuration and a maintenance configuration.

In order to put the mower in the maintenance mode, the mower front end must be lifted. Consequently, in embodiments without powered lift, the mower is designed to have a manually liftable weight.

The scissor lift deck height adjustment mechanism is simplified in comparison with many underbelly mowers. In particular, the scissor lift deck height adjustment mechanism includes a pair of scissor lift assemblies that raise and lower the deck by a scissoring action and a control assembly for manually actuating the scissor lift mechanisms. The front end of each scissor lift assembly is attached to the frame, while the scissor lift assembly rear ends are detached from the frame so that they slide along the frame. The scissor lift assemblies are operably movable between a plurality of configurations that correspond to a plurality of different cutting heights.

Each scissor lift assembly includes a drag bar and a crossing bar that are pivotably joined together in a crossing configuration. A front end of each of the drag bars is pivotably attached to the frame, while a rear end of the crossing bar is unattached to the frame and only to each other by a rod, so that the rod is free to slide along the underside of the frame. The rear ends of the drag bars and the front ends of the crossing bars are each pivotably joined to the deck. Further each drag bar is pivotably joined with a crossing bar where they cross.

The scissor lift assemblies are operably movable between a plurality of scissor positions, or configurations, that correspond to a plurality of different cutting heights. The scissor lift assemblies, located on opposite sides of the frame and deck, cooperate with one another to move the deck between the different cutting heights. The control assembly is operably linked with the scissor lift assemblies, so that a mower operator can move the scissor lift assemblies between the scissor positions. The frame of the embodiment illustrated herein is rigid, however, it is foreseen that the frame may utilize an articulateable front end to follow ground contour.

In an aspect of the invention, the frame includes a pair of spaced apart side structural members. The drag bar of each scissor lift assembly is pivotably attached to the front end of each of the side structural members.

In another aspect of the invention, each of the scissor lift assemblies includes a pair of scissor linkages (a drag bar and a crossing bar) that are pivotably joined together by a pivot pin so as to be movable between the plurality of scissor positions. In a further aspect, the plurality of scissor positions includes at least one opened position and a closed position. A first of the linkages (drag bar) includes a first end that is pivotably attached to the frame and a second end that is pivotably attached to the deck. A second of the linkages (crossing bar) includes a first end pivotably that is attached to the deck and a second end, wherein the second linkage second ends are joined together by a lateral rod.

In a further aspect, the pivot pin cooperates with the control assembly.

In another aspect, the frame includes a selection plate that has a plurality of bores that are associated with the cutting heights, and the control assembly includes a lever subassembly with a lever arm that operably engages the selection plate, a selection pin that is sized and shaped to engage the bores and a crank member, as well as a bell crank and rigid lateral rod that joins the crank member with the bell crank. The bell crank is biased in an operating position.

In a further aspect, the bell crank includes a biasing member. In another further aspect, the crank member and the bell crank each include an engagement surface that can operably engage a pivot pin.

In another aspect, the control assembly further includes two selection modes. When in a first selection mode, the scissor lift assemblies are selectively movable between the plurality of scissor positions. When in the second selection mode, the control assembly is disengaged from the scissor lift assemblies.

In another embodiment, an improved mower is provided. The improved mower has a frame and a mower deck that is suspended beneath the frame by a height adjustment mechanism, and the improvement includes a scissor lift mechanism with a first mode of operation cooperating with the frame to adjust cutting height and a second mode of operation wherein the scissor lift mechanism is pivotable with respect to the frame such that the deck is movable between cutting and maintenance configurations of the deck by swinging one end of the deck relative to the frame.

In yet another embodiment, a method of operating a mower that has a mower deck suspended beneath a frame by a scissor lift height adjustment mechanism is provided. The method includes the steps of providing a scissor lift assembly, using the assembly in a first mode to adjust cutting height of the deck, and using the assembly in a second mode to swing the deck about one end thereof relative to the frame between a cutting configuration and a maintenance configuration thereof.

The drawings constitute a part of this specification and include exemplary embodiments of the present invention and illustrate various objects and features thereof.

BRIEF DESCRIPTION OF THE DRAWINGS

FIG. 7 is an enlarged partial perspective view of the front underside to the mower of FIG. 1, with portions broken away and the deck not fully shown, so as to show greater detail of the positioning of the scissor lift height adjustment mechanism when the mower is in the maintenance mode shown in FIG. 2.

DETAILED DESCRIPTION OF THE INVENTION

Figure 1:
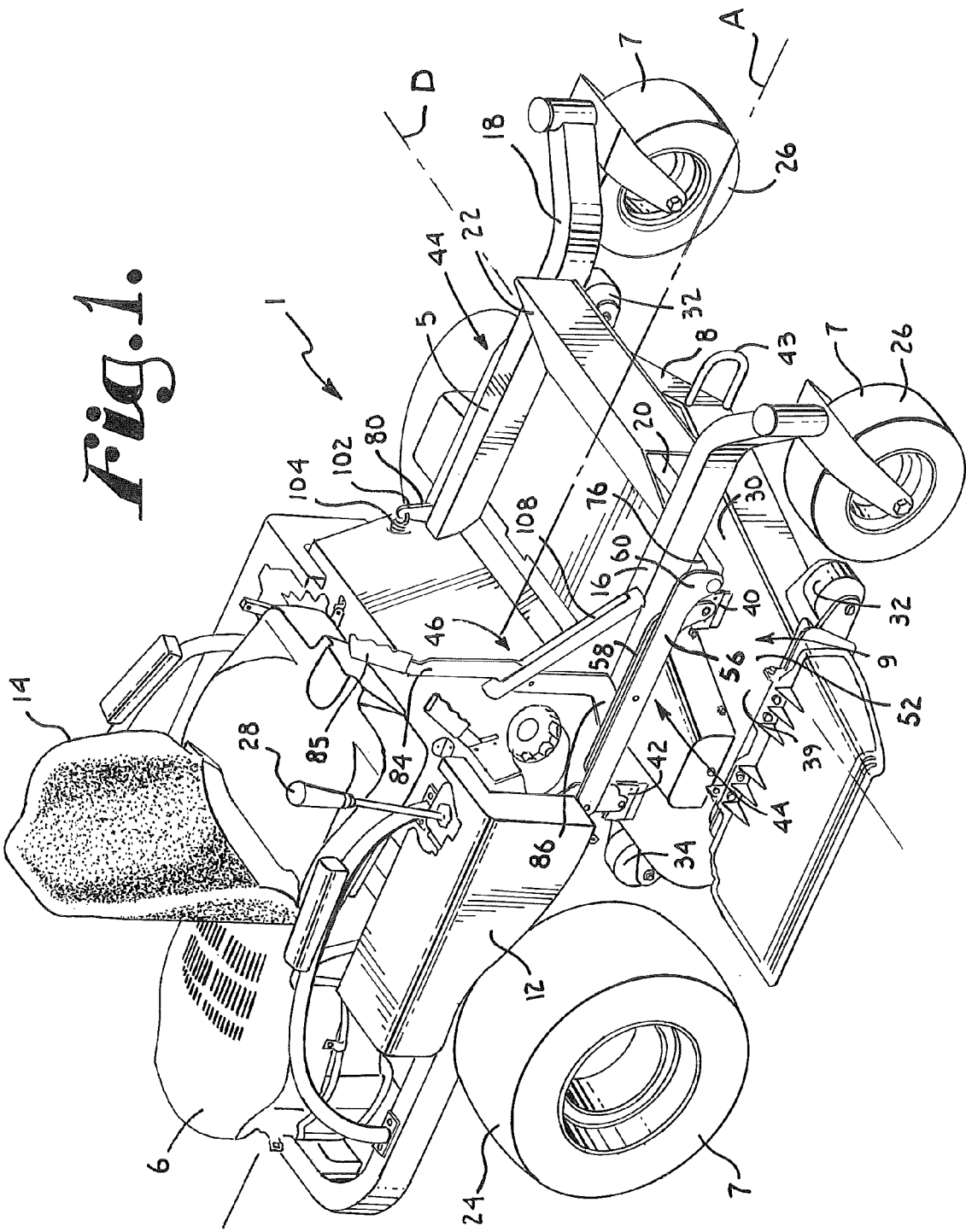
FIG. 1 is a perspective view of a mower in accordance with the present invention, the mower being in a first operating mode, an operational mode, with a deck suspended below a body of the mower and positioned at the highest cutting height.
Figure 1:
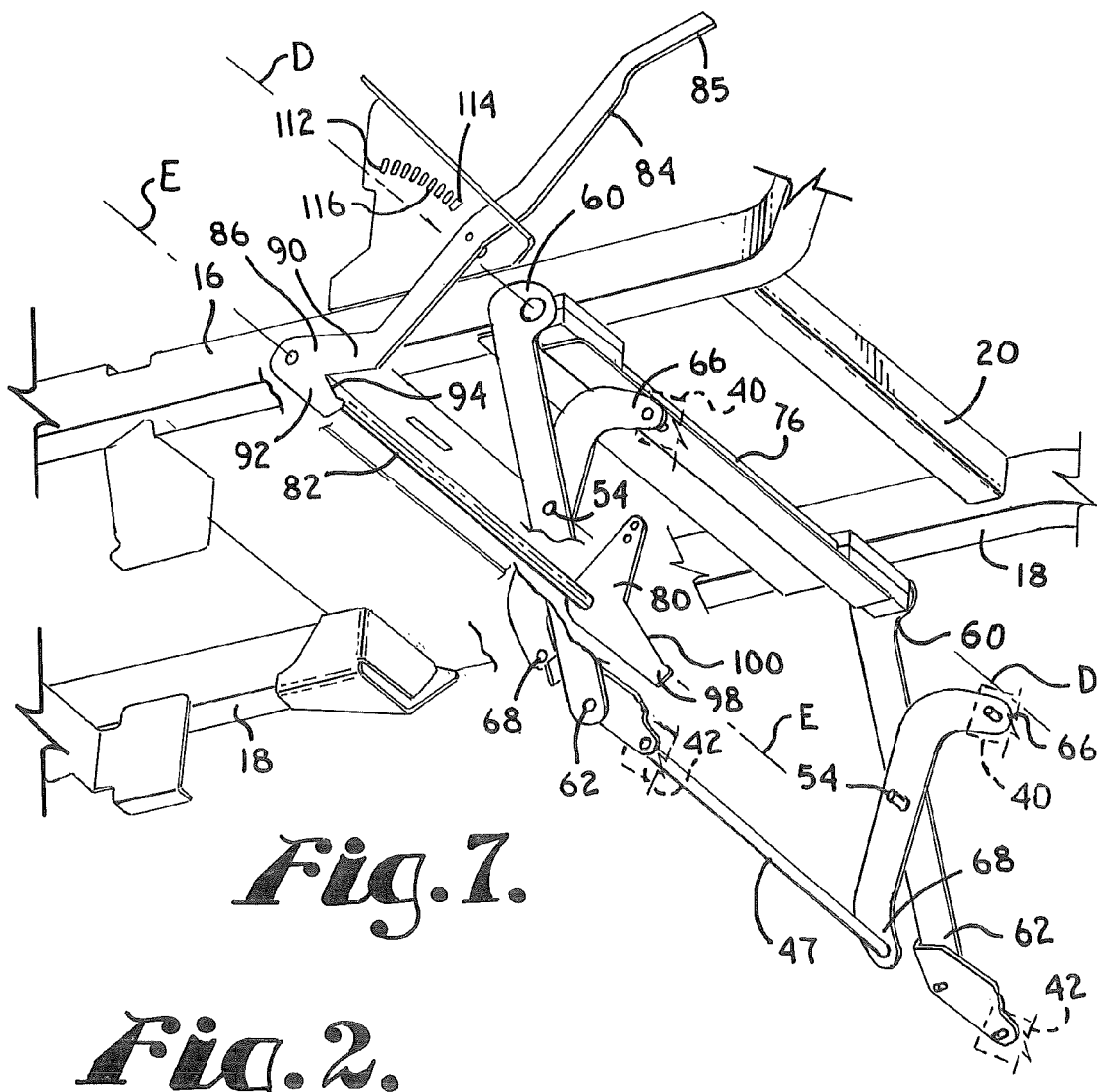

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to FIGS. 1 through 7, the reference numeral 1 generally represents a mower in accordance with the present invention. The mower 1 includes a frame 5, a motor and drive apparatus 6, ground engaging wheels 7, a mower deck 8 and a simplified scissor lift deck height adjustment mechanism, generally 9, and a longitudinal axis A. The weight of the mower 1 is substantially reduced, as compared to well know underbelly mowers on the market today, especially by simplification of elements, such that the mower front end can be manually lifted by an operator or a motorized lift, such as a jack screw (not shown), can be used to lift the front end.

Figure 2:
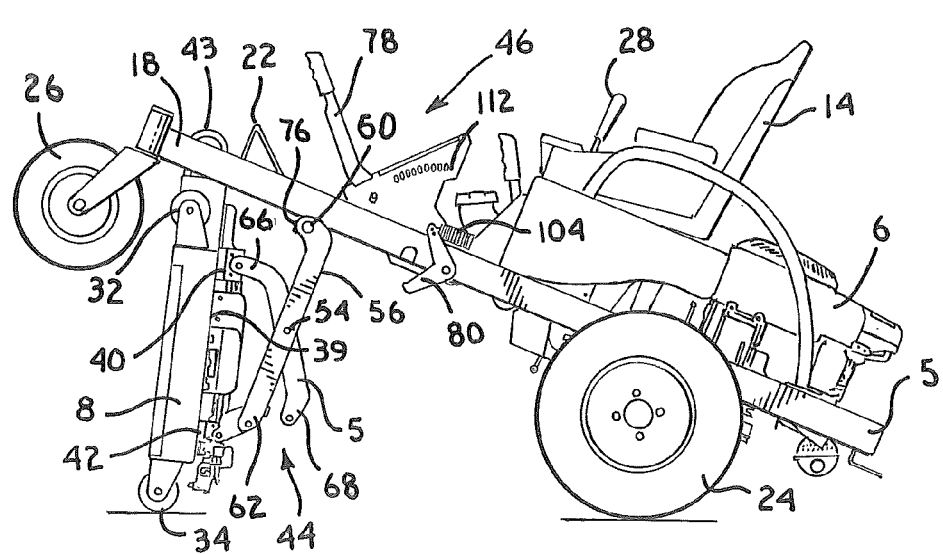
FIG. 2 is a reduced side view of the mower of FIG. 1, with the mower in a second operating mode, a maintenance mode, wherein a front end of the mower is raised and the mower deck is in a maintenance configuration.

The mower 1 includes two modes of operation. When in the first mode, also referred to as the operational mode (see FIG. 1), the mower 1 rests upon all of the wheels 7, the deck 8 is positioned for cutting and the scissor lift deck height adjustment mechanism 9 is operably adjustable between different deck cutting heights, such as is shown in FIG. 1, and which are described below. When the mower 1 is in the second mode, also referred to as the maintenance mode, the scissor lift deck height adjustment mechanism 9 cooperates with the frame 5 and the deck 8 to allow rotation of the deck 8 relative to the frame 5 simply by raising the front end, such that when the mower front end (to the left in FIG. 2) is lifted off of the ground, the mower 1 rests upon the rear of the deck 8, such as is shown in FIG. 2.

The simplified scissor lift deck height adjustment mechanism 9 and the reduced mower weight convey distinct advantages upon the mower 1, relative to other known underbelly mowers. In particular, there is no complicated deck suspension with many breakable parts that must be disengaged from the mower frame 5 prior to putting the mower 1 into a maintenance position.

As shown in FIG. 1, the frame 5 supports a body 12 and an operator's seat 14. The frame 5 is generally rigid and includes a pair of lower and forward extending side structural members 16 and 18 that are parallel with the axis A and are joined at the front by a cross member 20. Pivotally mounted on top of the side structural members 16, 18 is an operator floor board 22 which can be raised to provide access to lower elements of the mower 1.

The frame 5 also supports the motor and drive apparatus 6, which in the present embodiment includes a gasoline driven engine and a pair of hydrostatic transmissions (not shown) of a type that are generally well known in the art. It is foreseen that the motor and drive assembly 6 used with the invention can vary substantially and be consistent for use with the current invention.

The ground engaging wheels 7 of the illustrated embodiment include a pair of rear wheels 24 and a pair of front wheels 26. Preferably, the rear wheels 24 of this embodiment are separately driven by the separate transmissions to provide for "zero turning radius". A joy stick 28 is provided for the operator to control the direction of rotation and speed of each of the rear wheels 24 independently by hydraulic systems well known in the art.

The mower deck 8 is mounted so as to be suspended beneath the frame forward extending members 16, 18 by the height adjustment mechanism 9. The mower deck 8 has a main body 30 with front wheels 32 and rear wheels or rollers 34. As is common in the art, the deck 8 has an open underside 36 within which multiple mower blades 38 are mounted (see FIG. 3). The blades 38 are driven by a series of pulleys and drive belts 37 that are driven by the motor and drive apparatus 6, such as is known in the art. Two pairs of laterally spaced connectors extend upwardly from the deck upper side 39, including a pair of front connectors 40 and a pair of rear connectors 42. The connectors 40, 42 join the deck upper side 39 with the height adjustment mechanism 9. A handle 43 extends from the deck front end, to facilitate manual lifting of the deck front end.

The deck 8 includes two configurations: cutting or operational and maintenance. When in the cutting configuration, the deck 8 is open toward the ground, so that the blades 38 can cut the grass, such as is known in the art. When in the cutting configuration, the height of the deck 8 is adjustable, using the scissor lift height adjustment mechanism 9, such that the grass will be cut at a selected length. When in the maintenance configuration, the rear of the deck 8 is swung downward and forward, so that the mower can rest on the rear of the deck 8 (see FIG. 2), thereby providing easy access to the underside 36 of the deck 8, for maintenance purposes such as, but not limited to, cleaning and sharpening the blades 38 and replacing the blades 38.

Figure 4:
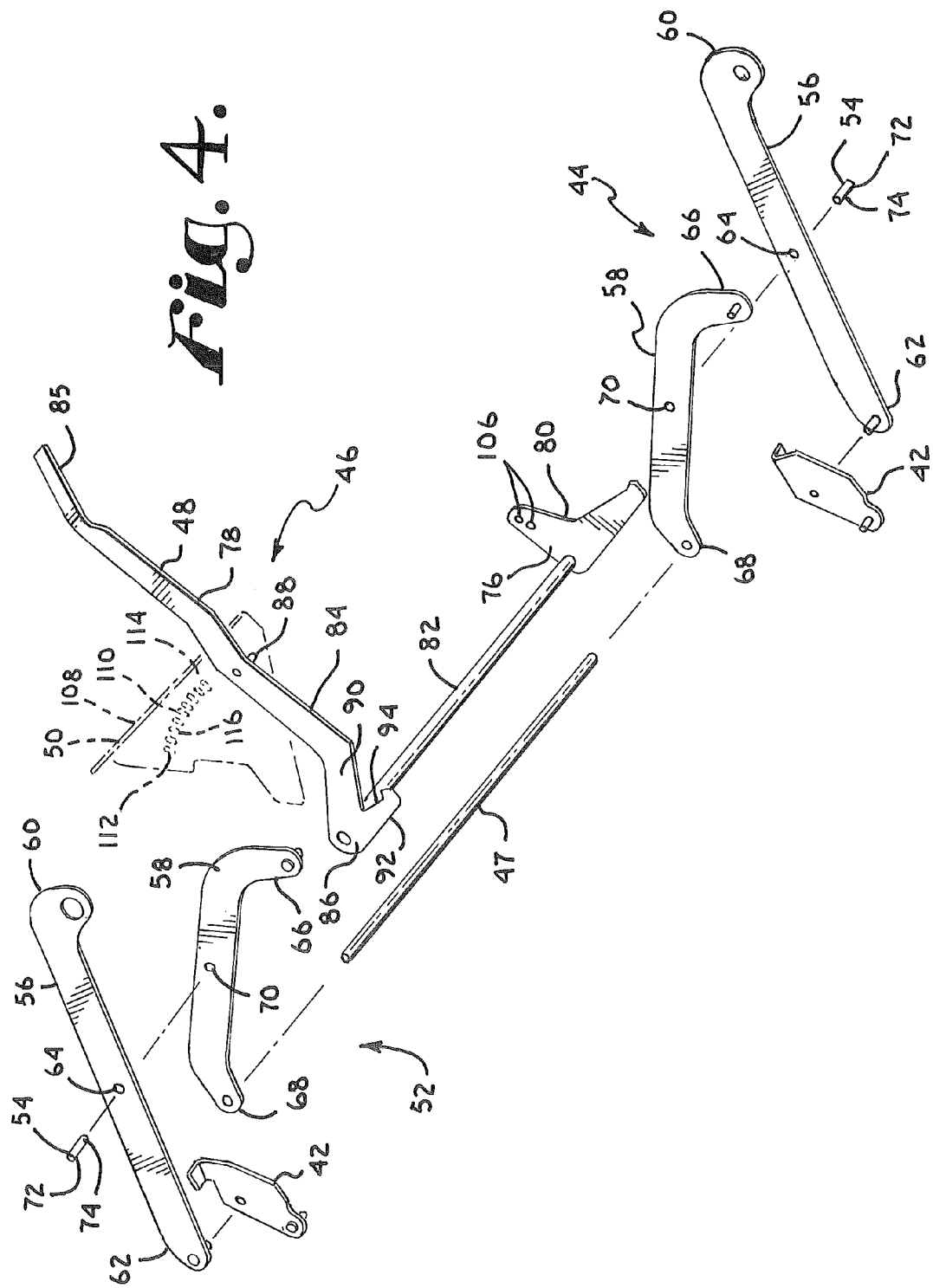
FIG. 4 is an exploded view of the scissor lift height adjustment mechanism of the mower of FIG. 1, including two scissor lift assemblies and a control assembly.

FIG. 4 is an exploded view of the scissor lift deck height adjustment mechanism 9, which includes a pair of scissor lift assemblies, generally 44, a control assembly, generally 46, and a linkage shaft or rod 47 that joins the scissor lift assemblies 44. Each of the scissor lift assemblies 44 includes a forward portion or front end 44a and a rear portion or rear end 44b.

The control assembly 46 includes a height selection subassembly 48 and a height selection plate 50 that is rigidly fixed to the frame 5. The height selection subassembly 48 is pivotably attached to the frame 5, such as by brackets 51 or other such structures known in the art, and operably engages the scissor lift assemblies 44 to move the deck 8 to the different cutting heights.

Each scissor lift assembly 44 includes a pair of scissor linkages 52 pivotably joined together in a crossing configuration by a central pivot pin 54. The linkages 52 comprise a drag bar 56 extending from the front end of the frame 5 to the rear of the deck 9 and a companion crossing or pivot bar 58 extending from the front of the frame 5 rearward. The rears of the crossing bars 58 are not joined to the frame, but are joined to each other by the shaft or circular bar 47. The two scissor lift assemblies 44 operate cooperatively in concert to suspend the deck 8 below the frame 5 and to move the deck 8 closer to and further from the frame 5, or upward and downward when the mower is in the operational mode, in response to the control assembly 46.

As noted above, each pair of scissor linkages 52 includes first (drag bar) and second (crossing bar) linkage members 56 and 58, respectively. The drag bars 56 pull the deck 8 forward during forward movement of the mower 1. As such, each drag bar 56 is a rigid elongate plate or rod with first and second ends 60 and 62, and a centrally located lateral through-bore 64. The crossing bars, are similar in construction, each being a rigid elongate plate or rod with first and second ends 66 and 68, respectively, and a centrally located lateral through-bore 70. The pair of scissor linkages 52 are attached to the frame side structural members 16, 18 such that the first ends 60, 66 are oriented in a forward direction and the second ends 62, 68 extend generally rearwardly. The through-bores 64 and 70 are sized and shaped so as to receive a pivot pin 54 therethrough, such that each drag bar 56 and crossing bar 58 can reversibly pivot on a respective pivot pin 54. When the drag bar 56 and crossing bar 58 pivot on a respective engaged pivot pin 54, their respective ends 60, 62, 66 and 68 swing about the pin 54 in a scissoring or arcing motion.

When assembled into a scissor lift assembly 44, the drag bar 56 and crossing bar 58 on each side of the mower 1 are adjacent to one another such that the through-bores 64, 70 are axially aligned. Further, the first ends 60, 66, of the adjacent drag bar 56 and crossing bar 58, are adjacent to or near one another and the second ends 62, 68 are in a complementary adjacent to or near to one another.

The pivot pin 54 is received through the aligned through-bores 64, 70, such that an axle portion 72 of the pivot pin 54 contacts and pivotably engages the inner surfaces of the through-bores 64, 70 and an engagement portion 74 of the pivot pin 54 extends out of or protrudes from the second linkage member through-bore 70. It is foreseen that the pivot pin would include an outer roller to facilitate movement. Since the scissor lift assemblies 44 are attached to the frame 5, the pin engagement portions 74 extend laterally inward and are substantially coaxial with one another, though it is foreseen that moving the deck 8 over uneven ground could cause the pins 54 to be temporarily non-aligned for a brief period of time, in some embodiments. In the illustrated embodiment, the drag bars 56 are depicted as being pivotably attached to the frame 5 so as to be exterior to the crossing bars 58. It is foreseen that in some embodiments the positions of the drag bars 56 and crossing bars 58 may be reversed or otherwise varied.

The drag bar 56 and crossing bar 58 are reversibly pivotable on the pivot pin axle portion 72 and can move between a fully closed position wherein the drag bar 56 and crossing bar 58 are parallel (see FIG. 1) to an opened position wherein the drag bar 56 and crossing bar 58 pivot in opposite directions on the pivot pin 54 so as to be in a non-parallel configuration (see FIGS. 2-3 and 5-7). In particular, the drag bar 56 and crossing bar 58 move in a scissoring motion, which may be referred to as a scissor action, by pivoting on the engaged pivot pin 54, whereby the first ends 60, 66 and the second ends 62, 68 swing closer together and farther apart. For example, the first ends 60, 66 can move farther apart and closer together, such as is indicated by the arrows B in FIG. 6. In another example, the second ends 62, 68 also move farther apart and closer together, such as is indicated by the arrows C in FIG. 6. The second ends 62, 68 move in concert with, or in cooperation with, the first ends 60, 66, so as to be complimentarily positioned.

When the drag bar 56 and crossing bar 58 are parallel with one another, the scissor lift assembly 44 can be said to be in a closed position or configuration, or simply closed, such as is shown in FIG. 1 and in this configuration the deck 8 is in the highest grass cutting position available with the mower 1. Conversely, when the drag bar 56 and crossing bar 58 are non-parallel, the scissor lift assembly 44 can be said to be in an open position or configuration, or simply opened, such as is shown in FIGS. 2-3 and 5-7. It is noted that as the scissor lift assemblies 44 are opening, the pivot pins 54 move further from the frame 5, or are lowered. When the scissor lift assemblies 44 are closing, the pivot pins 54 move closer to the frame 5, or are raised.

To simplify this discussion, the scissor lift assemblies 44 and their mode of action, or movements, will now be discussed in terms of lowering the deck 8 relative to the frame 5, and keeping in mind that the left scissor lift assembly 44 is mirror image of the right scissor lift assembly 44 and raising the deck 8 moves the scissor lift assemblies 44 in reverse to what is described below.

The right scissor lift assembly 44 includes a single closed configuration, or position, (see FIG. 1) and a plurality of opened configurations (see FIGS. 2-3 and 5-7). When the right scissor lift assembly 44 is closed, the drag bar 56 and crossing bar 58 are parallel (FIG. 1). When the right scissor lift assembly 44 is open, the drag bar 56 and crossing bar 58 are non-parallel. As the right scissor lift assembly 44 opens, and angle β is formed by the drag bar 56 and crossing bar 58 (see FIG. 6). As the scissor lift assembly 44 opens more, the angle 13 becomes progressively greater. As the scissor lift assembly 44 closes, the angle β becomes progressively smaller. When the scissor lift assembly 44 is closed, the angle β is zero. Further, each opened configuration includes a distance spaced between the adjacent right ends 60 and 66, and 62 and 68 of the drag bar 56 and crossing bar 58. Each of these distances is associated with a particular deck cutting height, and therefore the height of the blades 38 relative to the frame 5. Thus, when the right scissor lift assembly 44 moves toward a maximally opened configuration (FIG. 5), the deck 8 is lowered; as the scissor lift assembly 44 moves toward the closed position (FIG. 1), the deck 8 is raised.

The right drag bar 56 includes three pivotable connections. At its first end 60, the right drag bar 56 is pivotably attached or joined to the right frame side structural member 16 by a laterally extending intervening attachment member 76 (see FIGS. 1 and 3). It is foreseen that the first end 60 may be pivotably attached directly to the frame 5. At its second end 62, the right drag bar 56 is pivotably joined to the deck 8 by the rear connection 42 (see FIG. 1). Further, at its center portion, the right drag bar 56 is pivotably engaged with the right pivot pin 54. Since the weight of the deck 8 tends to pull the second end 62 downwardly, this configuration provides for the drag bar 56 pivoting about a lateral axis that is denoted by the letter D (see FIGS. 1 and 7). The axis D is coaxial with the pivoting joint that joins the first end 60 with the intervening member 76.

Unlike the drag bar 56, the right side crossing bar 58 is not connected to the frame 5. Consequently, the right crossing bar 58 reversibly pivots and floats adjacent to the frame 5. In particular, crossing bar 58 includes two pivotable connections. At its first end 66, crossing bar 58 is pivotably connected to the deck upper side 39 by the front connection 40 (see FIG. 1). And, at its center portion, the crossing bar 58 is pivotably engaged with the right pivot pin 54, which is the same pivot pin 54 described above with reference to the drag bar 56. At its second end 68, the crossing bar 58 is free to move freely along the frame 5 during operation. The second end 68 is rigidly joined or fixed to the left side crossing bar second end 68 by the shaft 47 (see FIG. 5), normally does but not to the frame 5. The second end 68 can move adjacent to the right side structural member 16, but not directly engage the right side structural member 16. Instead, the shaft 47 contacts and slidingly engages the underside to the frame 5 during operation and especially during height adjustment of the deck 8. This free floating movement of the second end 68 is also important for placing the mower 1 in the maintenance mode.

Due to the weight of the deck 8, the crossing bar first end 66 tends to swing downwardly. This downward movement urges the crossing bar 58 to pivot on the right pivot pin 54, thereby moving the second end 68 upwardly, such that the shaft 47 also is urged upwardly and engages the frame 5. Since the right crossing bar second end 68 is not fixed to the frame 8, the upwardly urged shaft 47 engages the underside of the right side structural member 16, so as to float or slide horizontally therealong. If the weight of the deck 8 is relieved, such as, but not limited to, by raising the pivot pin 54, this pivoting movement is reversed and the shaft 47 slides rearwardly along the underside of the right side structural member 16.

When taken together, the right drag bar 56 and crossing bar 58 cooperate with the right pivot pin 54 and the frame 5 to create the scissor action required for raising and lowering the deck 8. Additionally, this scissor action keeps the deck 8 substantially level or parallel with the frame 5, such as when raised above the ground and when mowing, and this enables the deck 8 to move smoothly over uneven ground, such as over bumps, small hills, dips or depressions in the ground during mowing.

As noted above, the left scissor lift assembly 44 is a mirror image of the right scissor lift assembly 44. Briefly, the left side drag bar 56 is attached to the left structural member 18 by the intervening attachment mechanism 76, so as to be pivotable about the axis D, and the second end 62 is attached to the deck 8 by connector 42. The left side crossing bar first end 66 is attached to the deck 8 by connector 40 and the second end 68 is rigidly joined to the shaft 42. Both the left drag bar 56 and crossing bar 58 pivotably engage the left side pivot pin 54 and move in a scissoring motion that is complementary to the scissoring motion of the right scissor lift assembly 44, which is described above. Thus, due to this configuration, the two scissor lift assemblies 44 move in a cooperative, coordinated manner to raise and lower the deck 8, and to keep it level and traveling smoothly over the ground. When the mower is in the operational mode thereof, the deck 8 weight pulls downwardly on the crossing bar 48 which then pivots at the pin 54 and urges the upper end of the crossing bar 58 and rod 47 against the frame 6 and slides therealong. As the mower 1 is raised to the maintenance mode seen in FIG. 2, the scissor lift assemblies 44 first extend to the furthermost open position thereof and thereafter the upper end of the crossing bar 58 and the rod 47 fall away from the frame 5, as is seen in FIG. 2. While the rod 47 engages the frame 5, the deck 8 is always parallel to the frame 5, even at different spacings therebetween but, when the rod 47 disengages from the frame 5, the frame 5 and deck 8 are no longer parallel to each other.

As is described in greater detail below, the inwardly extending pivot pin engagement portions 74 are operably engageable by the control assembly 46, such that the pivot pins 54 cooperate with the control assembly 46 to adjust the deck 8 between different cutting heights.

The control assembly 46 is provided to manually actuate the scissor lift assemblies 44, so that the mower operator can move the deck 8 to a desired cutting height and disengage the scissor lift assembly rear portions 44b in preparation for moving the deck 8 from the cutting configuration (FIG. 1) to the maintenance configuration (FIG. 2). Referring to FIG. 4, the control assembly 46 includes a height selection subassembly 48 and a height selection plate 50, which are sized, shaped and arranged to operably engage one another and simultaneously to modulate or modify the deck height.

The height selection subassembly 48 is provided for engaging the pivot pin engagement portions 74 and for raising and lowering the pins 54 relative to the frame 5. The height selection subassembly 48 includes an elongate lever arm 78 and a bell crank 80 that are rigidly joined by a lateral linkage rod 82 that is coaxial with a pivot axis E (see FIG. 7). The lever arm 78 includes an operator handle 84 with an upper grip 85 and a lower crank portion 86 and a centrally located selection pin 88. The linkage rod 82 joins the crank portion 86 to the bell crank 80 so that they are spaced apart and pivot in concert about the pivot axis E. The linkage rod 82 is rotatably attached to the frame by brackets 51 or other attachment structures known in the art that enable the lateral linkage rod 82 to roll, turn or rotate in an axle-like manner.

The crank portion 86 is generally V-shaped with upper and lower arms 90 and 92, respectively. The lower arm 92 has a engagement surface 94 that is sized and shaped to reversibly engage the engagement pin 54 of the adjacent scissor lift assembly 44. When the control assembly lifts the pins 54, the scissor lift assemblies 44 are urged to close. When the control assembly lowers the pins 54, the scissor lift assemblies 44 are urged to open due to the effect of gravity on the deck 8. For example, with reference to FIG. 3, when the mower 1 is in the first mode, the crank portion engagement surface 94 slidingly contacts or engages the surface of the right pivot pin engagement portion 74 and, therefore, provides for raising and lowering the right pivot pin 54.

Figure 5:
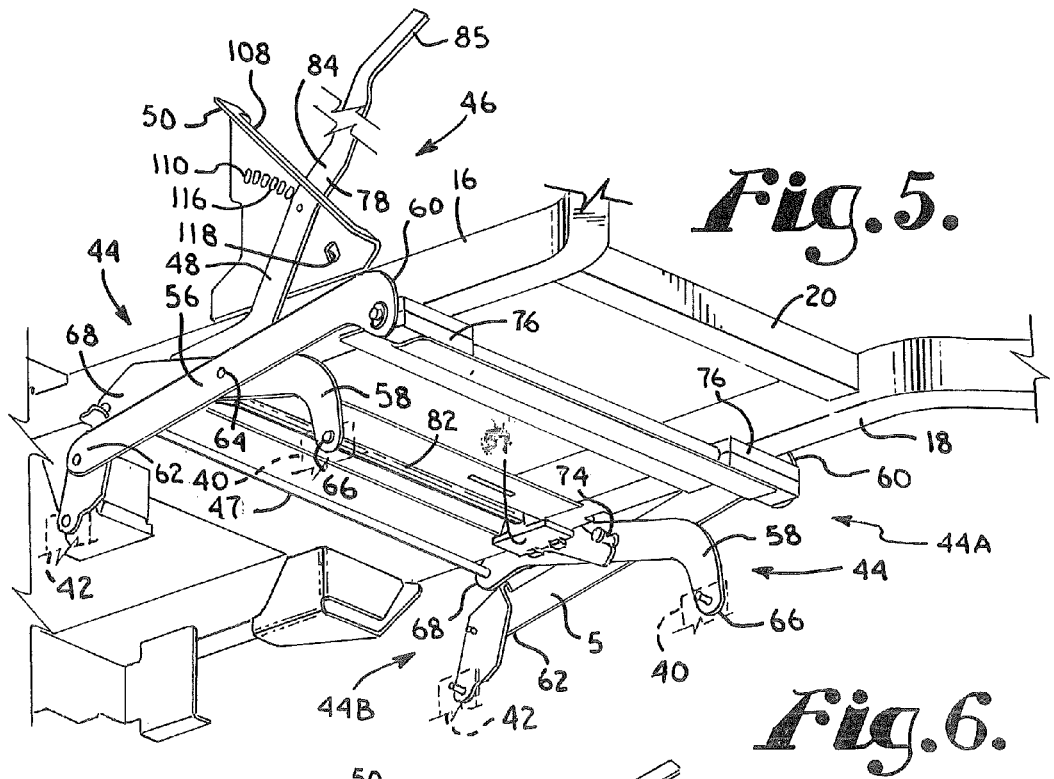
FIG. 5 is an enlarged partial perspective view of the front underside to the mower of FIG. 1, with portions broken away and the deck not fully shown, so as to show greater detail of the positioning of the scissor lift height adjustment mechanism when configured to position the deck at the lowest selectable cutting height.

The bell crank 80 is also V-shaped with joined upper and lower arms 96 and 98. As is shown in FIG. 5, the bell crank lower arm 98 includes an engagement surface 100 that slidingly contacts or engages the surface of the left pivot pin engagement portion 74, when the mower 1 is in the first mode. The upper arm 96 includes an attachment portion 102 that is operably attached to a biasing member 104. For example, in FIG. 3, the biasing member 104 is a pair of tensioning springs that are attached to the attachment portion 102 by the through-bores 106. In some circumstances, the biasing member 104 may includes various springs or other suitable interchangeable devices such as biasing structures known in the art. As shown in FIG. 2, the other end of the biasing member 104 is attached to the mower body 12. Alternatively, the biasing member 104 can be attached directly to the frame 5 (not shown).

The biasing member 104 pulls the bell crank upper arm 96 in a rearward direction such that the bell crank pivots about axis E, so that the biasing force urges the bell crank 80 to rotate in a clock-wise direction, thereby urging or lifting the engagement surface 100 upward. When the mower 1 is in the first mode, if the biasing force is sufficient to overcome the force of gravity on the deck 8, the left pivot pin 54 will tend to move upward (see FIG. 5) or the biasing mechanism may be tensioned to relieve only a portion of the weight of the deck 8 to lower the force an operator must apply to the control assembly 46. The shaft 82 transmits the biasing force to the crank portion 86, which is urged to rotate in a counter-clockwise direction about axis E, such that the crank portion engagement surface 94 swings upwardly and slidingly contacts or engages the right pivot pin 54 surface (see FIG. 3), thereby urging the right pivot pin 54 upward. This upward urging of the pivot pins 54 urges the scissor lift assemblies 44 to move toward the close configuration.

Gravity acts on the deck 8 to pull it downward. If the operator actuates the control assembly 46 by pulling the handle grip 85 rearward, the force of the operator pulling the grip 85 together with the biasing force are sufficient to overcome gravity acting on the deck 8, so that the deck 8 is lifted toward the frame 5. Generally, gravity alone is sufficient to overcome the biasing force. Thus, the deck 8 lowers when the operator removes his rearward pulling force by pushing the handle grip 85 forward. In particular, when the force of the operator pulling backward on the handle 85 is removed, the force of gravity overcomes the biasing force, and the deck 8 moves downwardly, away from the frame 5.

The height selection plate 50 modulates the scissor action so as to enable the operator to select predetermined cutting heights. The height selection plate 50 includes a receiving channel 108 that receives the operator handle 84 therethrough (see FIG. 1) and restricts the movement of the handle 84 to a defined movement path. The height selection plate 50 also includes a plurality of setting positions identified by bores 110 that are sized and shaped to receive the selection pin 88 and spaced across the movement path of the handle 84 (see FIGS. 4-7). Each of the bores 110 is associated with one of the cutting heights, a selectable position of the deck 8 and a position of the engagement surfaces 94, 100 and the respective pins 54, or a configuration thereof.

When the operator moves the handle 84 along the movement path to a bore 110 that receivingly engages the selection pin 88, further movement of the lower arms 92 and 98 is prevented. Therefore, the movement of the engagement surfaces 94 and 100 is stopped and the engagement pins 54 remain at the selected configuration, and the deck height is thus set.

For example, when the lever arm 84 is pulled all the way backward, or rearward, such as is shown in FIG. 1, the selection pin 88 moves into and engages the uppermost or most rearward bore 112. Concurrently, the crank portion 86 and the bell crank 80 pivot about the pivot axis E such that the engagement surfaces 94 and 100 swing upwardly and the pins 54 move upwardly so that the scissor lift assemblies 44 are closed. When the scissor lift assemblies 44 are closed, the deck 8 is positioned at the highest cutting height and the pins 54 are positioned closest to the intersections of the upper and lower arms 90 and 92, and 96 and 98 of the crank portion 86 and the bell crank 80, respectively.

Figure 3:
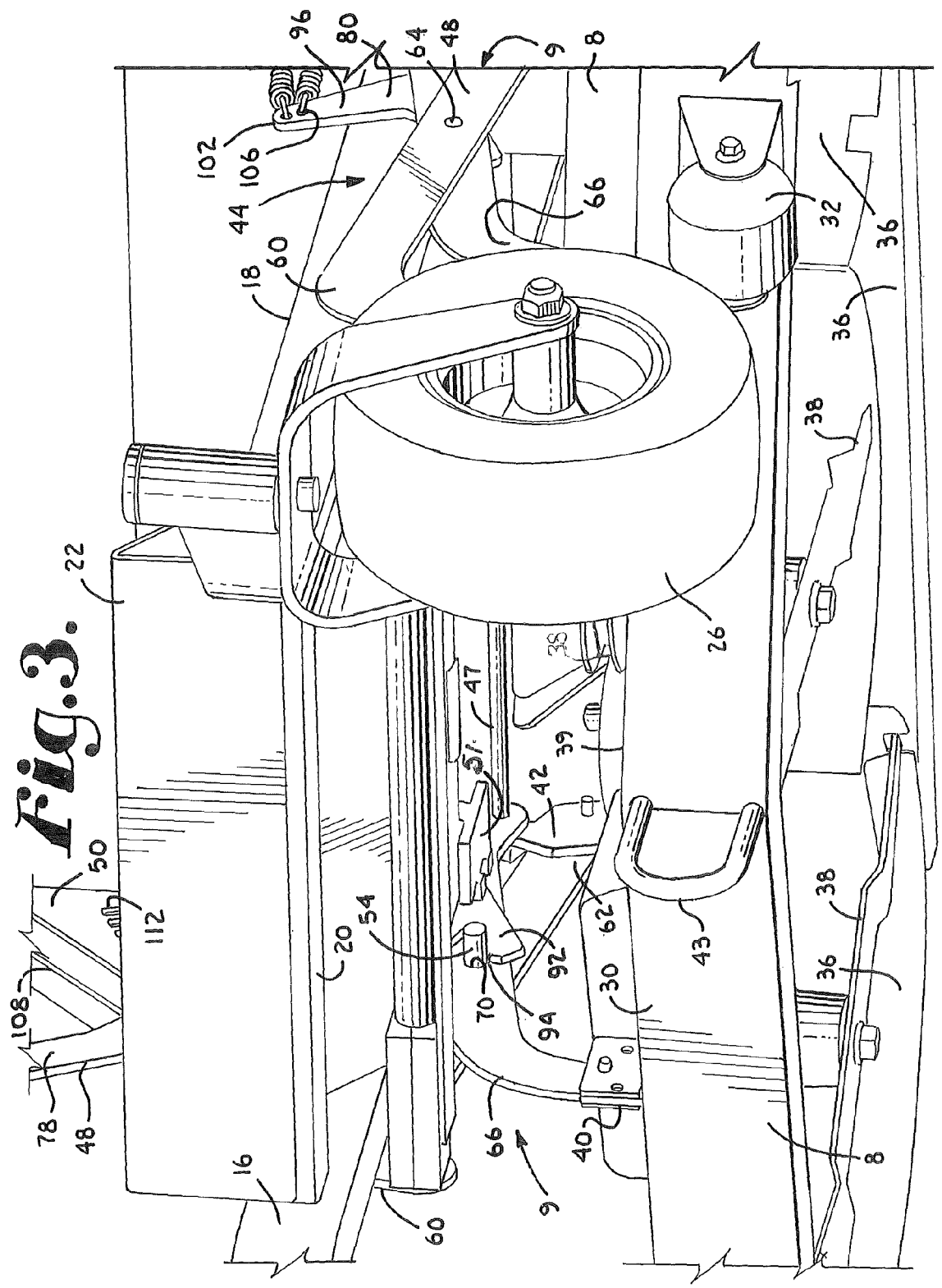
FIG. 3 is an enlarged perspective view of the front underside of the mower of FIG. 1, with portions broken away.

In another example, when the selection pin 88 engages the lowest or most forward bore 114, such as is shown in FIGS. 3 and 5, the crank portion 86 and the bell crank 80 pivot such that the engagement surfaces 94 and 100 pivot or swing downwardly. When the selection pin 88 is engaged with the bore 116, the scissor lift assemblies 44 are fully open and the deck 8 is positioned at the lowest possible cutting height. To reach this fully opened position, the engagement surfaces 94 and 100 pivot downwardly and the pins 54 slide toward the tips of the lower arms 92, 98 thereby allowing gravity to pull the deck 8 downward.

One or more intermediate bores 116 is located between the uppermost and lowermost bores 112 and 114. Each of the intermediate bores 116 is associated with a different configuration of the pins 56 and the engagement surfaces 94 and 100, wherein the configuration is in between or intermediate to the configurations associated with the bores 112 and 114 shown in FIGS. 1 and 5. Generally, it is convenient to position the bores 116 in series, or spaced, between bore 112 and bore 114. The series of the intermediate positions of the pins 56 and the engagement surfaces 94 and 100 provides a progressive series of intermediate cutting heights, such as at one fourth or one half inch increments. Thus, the operator can select an intermediate cutting height by moving the lever arm 78 such that the selection pin 88 engages a bore 116 associated with the desired cutting height.

The height selection plate 50 includes a disengagement bore 118, which is also sized and shaped to receivingly engage the selection pin 88. When the disengagement bore 116 and selection pin 88 are engaged, the pivot pins 54 are disengage from the selection surfaces 94 and 100. For example, when the disengagement bore 118 engages the selection pin 88, the engagement surfaces 94 and 100 pivot about the pivot axis E, so as to swing further downwardly and disengage from the pivot pins 54 (see FIG. 6). When the pins 54 and the selection surfaces 94 and 100 are disengaged, the rear of the deck 8 can swing downwardly and forward about the deck front end and the deck 8 is placed in the maintenance configuration, such as is shown in FIG. 2. To do so the drive belt (not shown) would normally be first disengaged between the deck 8 and motor 6 and reengaged when the mower is placed back in the operational mode. For example, after the engagement surfaces 94 and 100 have been disengaged from the respective pivot pins 54, the scissor lift assemblies 44 can pivot about the connection with the intervening attachment member 76, such that the drag bar and crossing bar second ends 62, 68 swing downwardly and forward to a maintenance position, such as is shown in FIG. 7.

It is foreseen that the scissor lift assemblies 44 and the control assembly 46 could be constructed as a mirror image of the embodiment shown in FIGS. 1-7.

In use the mower 1 is utilized to mow as a conventional mower. When height adjustment is desired, the deck 8 cutting height is adjusted by the scissor lift deck height adjustment mechanism 9.

Figure 6:
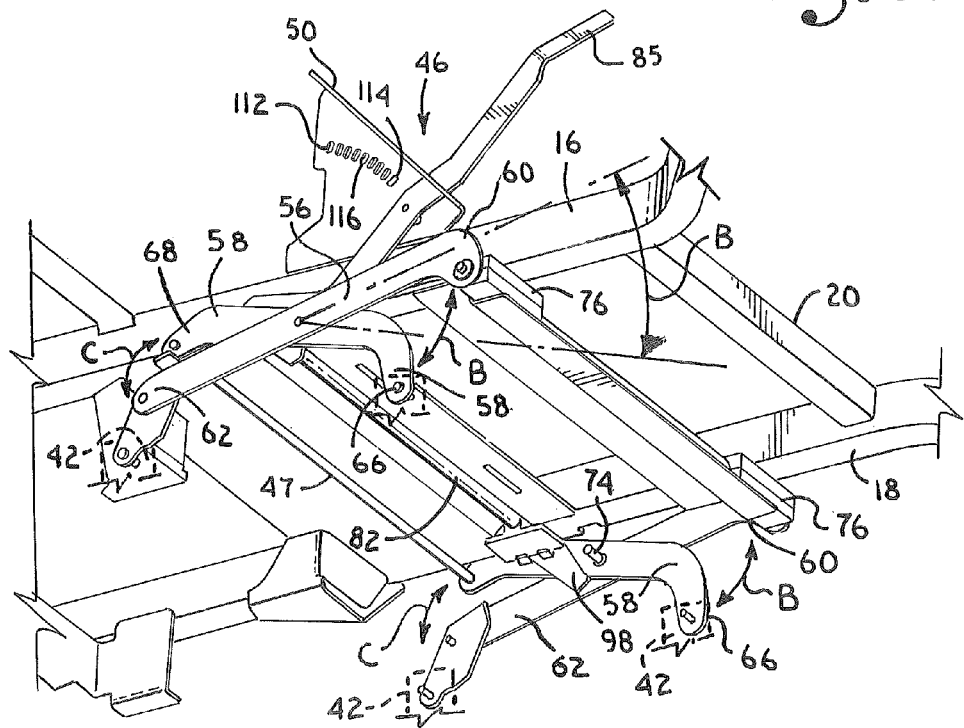
FIG. 6 is an enlarged partial perspective view of the front underside to the mower of FIG. 1, with portions broken away and the deck not fully shown, so as to show greater detail of the positioning of the scissor lift height adjustment mechanism when configured for moving the mower from the first operating mode shown in FIG. 1 to the second operating mode shown in FIG. 2.

When the lever arm handle 84 is actuated to lower the deck 8, the handle 84 is pushed forwardly or rearwardly until the selection pin 88 engages a bore 116 or 118 associated with a selected deck position. Consequently, the upper arms 90 and 96, of the bell crank 80 and the crank portion 86 respectively, are pivotably moved about the lateral rod 82 an amount forward and the lower arms 92 and 98 swing the same amount downwardly and about the axis of the lateral rod 82 so that the associated pivot pins 54 slide forward on the engaged engagement surfaces 94 and 100. As the pivot pins 54 slide forward on the engagement surfaces 94 and 100, gravity pulls the deck 8 downward. To raise the deck 8, this procedure is performed in reverse. In order to disengage the rear of the deck 8, for placing the mower in the maintenance mode shown in FIG. 2, the lever arm 78 is pushed all the way forward, until the selection pin 88 is receivingly engaged by the disengagement bore 116, thereby disengaging the pivot pins 54 from the engagement surfaces 94 and 100, such as is shown in FIG. 6. When the pivot pins 54 are disengaged from the engagement surfaces 94 and 100, gravity pulls the rear of the deck 8 downwardly and the rear of the deck 8 can pivot freely about the intervening attachment member 76 when the front of the mower 1 is raised, so as to expose the deck underside 36 for maintenance.

When it is desired to position the deck 8 for maintenance, the rear of the deck 8 is disconnected from the main frame 5 by moving the lever arm 78 maximally forward to the disconnect position so that the disengagement bore 116 engages the lever arm selection pin 88, which disengages the engagement surfaces 94, 100 from the pivot pins 54, such as is shown in FIG. 6. When the rear portions 44b of the scissor lift assemblies 44 are disengaged, the deck 8 is then lifted by the handle 43 such that the deck 8 can be rotated or swung at the front thereof relative to the frame 5 to the maintenance configuration seen in FIG. 2. The process is reversed when the service on the deck 8 is complete to return the deck 8 to the mowing configuration seen in FIG. 1.

It is foreseen that in certain embodiments, the scissor second ends 62 and 68 may be selectively and disconnectively joined to the frame 5 and may be joined to selectively disconnect on the deck 8.

It is to be understood that while certain forms of the present invention have been illustrated and described herein, it is not to be limited to the specific forms or arrangement of parts described and shown.

What is claimed and desired to be secured by Letters Patent is as follows:

1. A mower comprising:
   a) a frame having a rear and a front;
   b) a mower deck having a rear and a front; and
   c) a deck height adjustment mechanism joining the deck with the frame and cooperating with the frame and the deck to vary the cutting height of the deck relative to the frame; and wherein
   (d) the height adjustment assembly comprises first and second linkages pivotally and medially joined together at a pivot; the first linkage having a first end connected to the deck near the rear of the mower deck and a second end pivotally connected to the frame near the front of the frame; the second linkage having a first end connected to the mower deck near the front of the mower deck and a second end that is free from attachment to the frame but which is sized, shaped, and located so as to slide along the frame during height adjustment in a cutting configuration and so as to freely disengage from the frame when in a maintenance mode.

2. The mower according to claim 1, the mower wherein:
   a) the height adjustment mechanism is a first height adjustment mechanism on one side of the mower frame and further comprising a second height adjustment mechanism on an opposite side of the frame; a front end of each lift assembly being pivotally mounted on the deck forward of the pivot such that weight of the deck causes a rearward portion of the lift assembly to be biased but slidable against the frame during mower operation.

3. A method of operating a mower having a mower deck suspended beneath a frame by a height adjustment mechanism including the steps of:
   a) providing a scissor lift assembly including first and second linkages medially joined by a pivot and wherein each linkage has a first end and a second end b) pivotally joining a first end of the first linkage to a rearward side of the deck and a second end of the linkage to a frontward side of the frame;
c) pivotally joining a first end of the second linkage to a frontward side of the deck;
d) leaving the second end of the second linkage unattached from the frame while allowing the second end of the second linkage to engage the frame during operation of the mower and to slide along the frame during height adjustment of the deck;
e) adjusting the height of the deck relative to the frame by alternatively moving the pivot toward and away from the frame while allowing the second linkage second end to slide along the frame.

4. The method according to claim 3 including the steps of:
a) raising the front end of the frame so as to move into a maintenance mode;
b) allowing the detached second end of the second linkage to become spaced from the frame such that the mower deck swings about the second end of the first linkage from a position wherein the mower is substantially parallel to the frame in a cutting mode to a second position wherein the mower is not parallel to the frame in the maintenance mode.

5. A mower comprising:
a) a frame having a front end;
b) a mower deck having a rear end and a front end; and
c) a deck height adjustment mechanism joining the deck with the frame and cooperating with the frame and the deck to vary the cutting height of the deck relative to the frame; and wherein
d) the height adjustment assembly comprises a pair of scissor assemblies located on opposite sides of the mower; each scissor assembly comprising first and second linkages pivotally and medially joined together at a pivot; each of the first linkages having a first end connected to the rear end of the deck and a second end pivotally connected to the frame near the front end of the frame; each of the second linkages having a first end connected to the front end of the mower deck and a second end that is free from attachment to the frame and that is sized, shaped, and located so as to slide along the frame during height adjustment in a cutting configuration and so as to freely disengage from the frame when in a maintenance mode.

6. The mower according to claim 5 wherein:
a) both of the second linkage second ends are joined by a first rod; and
b) both of the pivots are joined by a second rod.

7. The mower according to claim 6 including:
a) a height adjustment lever arm operably engaging the second rod so as to move the second rod alternatively closes and away from the frame during height adjustment by a user.

8. A mower comprising:
a) a frame;
b) a mower deck; and
c) a deck height adjustment mechanism joining the deck with the frame and cooperating with the frame and the deck to vary the cutting height of the deck relative to the frame;
d) a pair of scissor lift assemblies, each scissor lift assembly including a front end pivotally attached to the frame and a rear end that is slidable along the frame during height adjustment and mowing operation of the mower, the scissor lift assemblies being operably movable between a plurality of configurations corresponding to a plurality of different cutting heights, whereby the scissor lift assemblies cooperate to move the deck between the different cutting heights; each scissor lift assembly includes:
   i) a pair of scissor linkages pivotally joined together by a pivot pin so as to be movable between the plurality of scissor positions; wherein
   ii) the plurality of scissor positions including at least one opened position and a closed position;
   iii) a first of the linkages includes a first end pivotally attached to the frame and a second end pivotally attached to the deck; and
   iv) a second of the linkages includes a first end pivotally attached to the deck and a second end; and
   v) the second linkage second ends are joined by a laterally extending rod;
e) a control assembly operably linked with the scissor lift assemblies, whereby an operator of the mower moves the scissor lift assemblies between the plurality of configurations;
f) the height adjustment mechanism first linkage having a front end that is pivotally attached to the front of the frame and a rear end of a second linkage that is free of attachment to the frame; wherein
g) when in a first operating mode the deck height adjustment mechanism is operably adjustable between different cutting heights of the deck in a cutting configuration;
h) when in a second operating mode, the deck height adjustment mechanism cooperates with the frame and the deck to rotate the deck about a front end of the deck between the cutting configuration and a maintenance configuration.

9. The mower according to claim 8, wherein:
a) the pivot pin cooperates with the control assembly.

10. The mower according to claim 8, wherein:
a) the frame includes a selection plate with a plurality of bores associated with the cutting heights; and
b) the control assembly includes:
   i) a lever subassembly with a lever arm operably engaged with the selection plate, a selection pin sized and shaped for engaging the bores and a crank member;
   ii) a rigid lateral rod joined with the crank member; and
   iii) a bell crank joined with the lateral rod and biased in an operating position.

11. The mower according to claim 10, wherein:
a) the bell crank includes a biasing member.

12. The mower according to claim 10, wherein:
a) the crank member and the bell crank each include an engagement surface operably engageable with a pivot pin.

13. The mower according to claim 10, wherein the control assembly further includes:
a) a first selection mode, wherein the scissor lift assemblies are selectively movable between the plurality of scissor positions; and
b) a second selection mode, wherein the control assembly is disengaged from the scissor lift assemblies.

* * * * *